US009645812B2

(12) United States Patent
Proschowsky

(10) Patent No.: US 9,645,812 B2
(45) Date of Patent: May 9, 2017

(54) HEADSET FIRMWARE UPDATE FROM HEADSET BASE UNIT

(71) Applicant: GN Netcom A/S, Ballerup (DK)

(72) Inventor: Morten Proschowsky, Søborg (DK)

(73) Assignee: GN Netcom A/S (DK)

( * ) Notice: Subject to any disclaimer, the term of this patent is extended or adjusted under 35 U.S.C. 154(b) by 7 days.

(21) Appl. No.: 14/967,318

(22) Filed: Dec. 13, 2015

(65) Prior Publication Data
US 2016/0098264 A1     Apr. 7, 2016

Related U.S. Application Data

(63) Continuation of application No. 14/223,230, filed on Mar. 24, 2014, now abandoned.

(30) Foreign Application Priority Data

Mar. 26, 2013   (EP) ..................... 13160990

(51) Int. Cl.
*G06F 9/44* (2006.01)
*G06F 9/445* (2006.01)
*H04M 3/51* (2006.01)
(52) U.S. Cl.
CPC ............ *G06F 8/65* (2013.01); *G06F 8/665* (2013.01); *G06F 8/71* (2013.01); *H04M 3/5183* (2013.01)
(58) Field of Classification Search
USPC ........................................ 717/169
See application file for complete search history.

(56) References Cited

U.S. PATENT DOCUMENTS 7,283,635 B1   10/2007   Anderson
7,738,434 B1    6/2010   Reuss
(Continued)

FOREIGN PATENT DOCUMENTS

EP   1793573   6/2007
EP   2424202   2/2012

OTHER PUBLICATIONS

European Search Report for European Application No. 13160990 dated Sep. 9, 2013.

*Primary Examiner* — Marina Lee
(74) *Attorney, Agent, or Firm* — Altera Law Group, LLC

(57) ABSTRACT

A method of updating a headset system firmware and a headset system are provided. The headset system comprises a headset and a base unit, the base unit having a base unit control circuit and being configured to connect to a computer system, the base unit comprises a headset dock to receive the headset. The method comprises the steps of receiving, in the base unit control circuit, a headset system firmware update from the computer system, the headset system firmware update comprising a headset firmware update and/or a base unit firmware update, and updating the base unit control circuit with the base unit firmware update. In a base unit storage, storing the headset firmware update having a headset firmware update version and when a headset having a current headset firmware version is received in the headset dock, controlling the base unit control circuit to check whether the current headset firmware version is the same as the headset firmware update version stored in the base unit storage, and updating the current headset firmware with the stored headset firmware update if one or more conditions are fulfilled.

13 Claims, 3 Drawing Sheets

(56) References Cited

U.S. PATENT DOCUMENTS

| | | | |
|---|---|---|---|
| 7,881,745 B1 | 2/2011 | Rao et al. | |
| 8,589,908 B2 * | 11/2013 | Subbakrishna | G06F 8/65 711/142 |
| 2003/0165230 A1 | 9/2003 | Reuss | |
| 2004/0034861 A1 | 2/2004 | Ballai | |
| 2006/0010437 A1 * | 1/2006 | Marolia | G06F 8/65 717/168 |
| 2006/0234632 A1 * | 10/2006 | Lin | H04W 8/245 455/41.2 |
| 2008/0090524 A1 * | 4/2008 | Lee | H04W 84/20 455/41.2 |
| 2010/0048134 A1 | 2/2010 | McCarthy et al. | |
| 2010/0190532 A1 * | 7/2010 | Sampat | H04W 8/245 455/569.1 |
| 2012/0096111 A1 * | 4/2012 | Jellinek | H04M 1/72525 709/217 |
| 2013/0157649 A1 | 6/2013 | Pedersen et al. | |
| 2014/0298309 A1 * | 10/2014 | Proschowsky | G06F 8/65 717/170 |
| 2016/0098264 A1 * | 4/2016 | Proschowsky | G06F 8/65 717/169 |

* cited by examiner

HEADSET FIRMWARE UPDATE FROM HEADSET BASE UNIT

FIELD OF INVENTION

The present invention relates to headset systems, such as headset systems having a headset and a base unit, and particularly to headset systems, such as wireless headset systems, in which more headsets are used with one base unit.

BACKGROUND

A growing number of businesses use call centers to handle interactions with customers. The call centers use groups of agents to handle all inbound and outbound calls. Companies typically use call center services, for example, as a help desk for banks, service providers, and others, or to manage outbound and inbound communication campaigns to potential customers for telemarketing or to existing customers for collecting information or customer follow-up.

In a call center, there may thus be numerous incoming lines and a number of call center agents ready to answer the incoming calls. To efficiently answer incoming telephone calls, the incoming calls are placed in a queue and answered by a call center agent, typically after a waiting period, and likewise for outbound calls.

In call centers, headsets may be advantageous for the call center agents, to allow for e.g. simultaneous use of a computer system, and typically, a base unit is connected to a computer or soft phone application and a headset is provided for the agent to use.

Typically, each agent has a personal headset which may be stored or locked away in storages or lockers when not in use. It is envisaged that also in other environments may a plurality of headsets be allocated to a limited number of base units so that not all headsets are docked simultaneously.

The headsets are becoming increasingly complex having numerous build-in functions to support the users, such as user interfaces, such as user interfaces including call control functions, adjustable audio settings, etc., such as wireless communication interfaces, etc. To keep the headsets updated and be able to install new functionalities, such as to e.g. allow the use of new wireless protocols for communication, or to fix known bugs in the firmware, the headset firmware may be updated.

Typically, the headset is updated when connected to a computer prompting to install the update. However, this may be disregarded by users in a busy environment so that the headset firmware is not updated, and additional functionalities thereby not installed. If the update is performed, the updating process may take up valuable working time for employees.

SUMMARY OF THE INVENTION

It is an object of the present invention to provide an improved firmware updating method and a system therefore.

According to the invention a method of updating a headset system firmware is provided. The headset system comprises a headset and a base unit, the base unit having a base unit control circuit and being configured to connect to a computer system, the base unit comprising a headset dock to receive the headset. The method comprising the steps of receiving, in the base unit control circuit, a headset system firmware update from the computer system, the headset system firmware update comprising a headset firmware update and/or a base unit firmware update and updating the base unit control circuit, if applicable, with the base unit firmware update. In a base unit storage, storing the headset firmware update having a headset firmware update version and when a headset having a current headset firmware version is received in the headset dock, controlling the base unit control circuit to check whether the current headset firmware version is the same as the headset firmware update version stored in the base unit storage, and updating the current headset firmware with the stored headset firmware update if one or more conditions are fulfilled.

It is an advantage of the present invention that mass deployment of firmware updates for headset systems may be provided e.g. by a central IT department to update the headset systems, and particularly to update the headset firmware also for headsets which are not connected or docked at the time of deployment. For example in a call center, the computers or PCs are most frequently stationary PCs, so that when a software or firmware is mass deployed, the software or firmware is immediately installed, thus in the present context, the base unit firmware update is immediately installed in every base unit and a data package comprising the headset firmware update may be stored in every base unit storage to await the connection of headsets. It is an advantage for the administration of the software and firmware updates that any software or firmware update, such as the headset system firmware update, may be removed from the computers or PCs right after installation of the software or firmware without awaiting that all headsets have been in use and been updated, a procedure which may take months to complete.

According to a further aspect of the invention a headset system comprising a base unit and one or more headsets configured to connect to the base unit, is provided. The one or more headsets may be configured to connect to the base unit, and the one or more headsets may each comprise an earphone, a microphone, and may be configured to provide an interconnection to the base unit. The headsets may further comprise a processor configured to process audio signals and a headset control circuit being configured to control the processor and the interconnection with the base unit. Each headset may have a current headset firmware version. The base unit may be configured to connect to a computer system and may comprise a base unit storage, a dock for receiving the headset and a base unit control circuit configured to control a base unit processor. The base unit control circuit may be configured to receive a headset system firmware update from the computer system, the headset system firmware update comprising a base unit firmware update and a headset firmware update. The base unit control circuit may be configured to store the headset firmware update in the base unit storage, and to update a current headset firmware of a headset connected to the base unit if a current headset firmware version is different from the headset firmware update version stored in the storage.

It is a particular advantage of the invention that updating of the headset systems, and particularly of the base units, outside of working hours regardless of whether a headset is received in the base unit is facilitated. Typically, the updating of the base unit firmware requires a significantly longer time than the updating of the headset firmware and it is therefore advantageous, especially in a call center environment, that the base unit firmware is updated when the headset system is not in use. The headset firmware may subsequently be updated upon docking of the headset in the base unit. The headset dock may comprise any means for connecting the headset with the base unit, the headset dock may be any electrical interconnection, and the headset dock may comprise a cable, an interconnecting element, etc. The headset dock in the base unit may throughout the description be referred to as the dock.

The headset system firmware comprises the program code for the headset and the program code for the base unit. Upon manufacturing of the headset system, a base unit firmware is installed in the base unit and a headset firmware is installed in the headset. Typically, the firmware is further developed over the lifetime of the product so that bugs, or other known problems with the firmware, may be resolved, so as to improve already existing functionalities or features, for example to allow communication over a new wireless protocol, etc., or the firmware may be further developed to add additional functionalities or features to the headset system. Thus, if the headset is a wireless headset, the wireless protocol may be updated with the firmware update.

To allow for an update of the firmware in existing products, a firmware update may be made available to the headset system users. The firmware may be characterized by a version of the firmware, and the currently installed firmware version is the current firmware version. A firmware update may be characterized by a firmware update version and the installation of the firmware update updates the version of the firmware. The firmware update may replace only parts of the current firmware, or the firmware update may overwrite the current firmware entirely. A firmware update typically increments the version of the firmware, so that the current firmware version, after updating with a firmware update version, corresponds to the firmware update version.

A new release of a firmware may be referred to as the latest or newest firmware version, and a previous version of a firmware may be referred to as an older firmware version.

The headset system firmware currently installed in a headset system is the current headset system firmware having a current headset system firmware version, and thus, the base unit firmware currently installed in the base unit is the current base unit firmware having a current base unit firmware version, and the firmware currently installed in the headset is the current headset firmware having a current headset firmware version.

One condition for installing a headset firmware update may be that the headset firmware update version is different from the current headset firmware version. Thus, this condition is fulfilled as long as the headset firmware update version is different from the current headset firmware version. A further condition may be whether the headset firmware update version is newer and/or has a higher version, such as a higher version number, than the current headset firmware version. This condition may be fulfilled when the headset firmware update version is newer and/or has a higher version than the current headset firmware version.

Upon docking of the headset in the base unit, a number of procedures may be performed: The base unit, such as the base unit control circuit, may check whether the headset is paired with the base unit, and perform the pairing if relevant, the base unit, such as the base unit control circuit, may furthermore check whether a headset firmware update is available in the base unit storage and install the headset firmware update if relevant, i.e. if the one or more conditions are fulfilled. As the base unit firmware is updated at times when the headset system is not in use, only the headset may need updating after docking of the headset in the dock, and as the process to update the headset firmware is typically much faster than the process to update the base unit firmware, valuable system time, such as call agent operation time, is gained. Typically, it takes only ¹/₁₀ of the time it takes to update the base unit to update the headset.

It is advantageous that by ensuring regular updating of the headset firmware, for example as soon as a new headset firmware update version is detected, and in that all headsets are updated upon docking to also receive the latest headset firmware version, proper functionality of the headset systems are maintained in that e.g. the base units and headsets will be operating having a same firmware version.

The headset system may be a wireless system wherein the base unit and the headset comprise a wireless communications unit being configured for wireless data communication. The wireless communications unit may comprise a transmitter, a receiver, a transmitter-receiver pair, such as a transceiver, a radio unit, etc. The wireless communications unit may be configured for communication using any protocol as known for a person skilled in the art, including DECT, Bluetooth, WLAN standards, manufacture specific protocols, etc. Typically a transmitter-receiver pair will be provided in the headset and a corresponding transmitter-receiver pair will be provided in the base unit.

The communications unit provided in the headset may be configured to communicate wirelessly with the base unit and the communications unit may be connected to a headset control circuit configured to control a speaker, a microphone and a signal processor configured to process audio signals, in the headset. The headset control circuit may further be configured to receive user input via a headset user interface and to control the signal processor to operate the headset in accordance with user input.

The headset system may comprise at least one headset and a base unit, and the base unit may be configured to connect to a computer system, such as a telephone system, such as a soft phone system, a call center phone management system and/or an internet provided phone system. The base unit may have a base unit control circuit, and may furthermore comprise a headset dock to receive the headset and a base unit storage configured to store one or more headset firmware updates having one or more headset firmware update versions.

It is an advantage of updating the headset firmware when the headset is connected directly to the base unit, e.g. by wire or by docking the headset in a headset dock, that the current headset firmware may be overwritten with the headset firmware update. Updating the headset firmware via for example a wireless connection would require that two versions of the headset firmware should be available in the headset, i.e. the current headset firmware for handling the wireless connection, and the headset firmware update to be installed when the wireless transmission was completed.

An update of the firmware of a device, such as a headset system, is a critical operation, as the firmware comprises the program code for the device including operational instructions for the headset system. During updating of the firmware, the existing firmware, such as the existing program code, may be overwritten with the update firmware, and it follows, that if the update is interrupted due to e.g. power shortage or disconnection of the device during the update and before the update is completed may make the device unusable.

In order for a user not to unintentionally interrupt a firmware update, the headset system may have a firmware update mode in which the headset is docked in the base unit and not operational. Thus, during the headset firmware update, the headset system may not be provided in a standby mode, and the computer system or telephone system may not recognise that a headset system is connected to the computer system. Alternatively, the base unit may be detectable and only the headset may not be detectable.

Additionally or alternatively, an alert may be provided to a user during updating of the headset firmware. The alert may be a visible alert, an audible alert or a combination thereof. For example, the base unit may have one or more lights, such as light emitting diodes lighting or flashing in a predetermined way, a symbol as to indicate "do not remove headset" may be lighting or flashing, the base unit may have a display displaying a message as to alert the user not to remove the headset, and or the base unit may emit a sound, such as a warning sound, such as a spoken alert, such as an alert message, such as "do not remove headset—headset firmware update in progress", etc. The headset may be provided in the firmware update mode if the base unit control circuit determines that the current headset firmware version is different from the headset firmware update version, preferably so that the headset firmware update version is higher than the current headset firmware version, and the updating of the headset firmware is initiated.

Some headset systems may allow for a conference calling functionality or a call monitoring functionality where several headsets may be connectable, wirelessly, to the same base unit simultaneously. This may allow several users to join a call initiated by a primary headset system user to establish a conference call, or this may allow for call monitoring for quality, supervision or training purposes. For example, if a primary headset system user has initiated a call, additional headset users may attend the call by pairing their headsets with the primary headset system base unit to establish a conference call. For example a supervisor may dock the supervisor headset in the base unit of the caller to access the call to monitor the call. The additional headsets may be paired with the base unit as secondary headsets, the order of the pairing of such an additional headset is a secondary pairing.

The base unit control circuit may, upon connection of a headset to the base unit, check which order of pairing the headset as connected to the base unit should be allocated. For example, the base unit control circuit may upon receiving a headset in the headset dock, check whether the base unit is already paired with the headset or whether it is a new or unpaired headset. If it is a new headset, the base unit control circuit checks which order of pairing the headset as received in the dock should be allocated. If a paired headset is not within a range of the base unit, the headset received in the dock is allocated a primary order of pairing and the headset is a primary headset. If a paired primary headset is within the range of the base unit when a headset is received in the dock, the headset may be a secondary, or an additional, headset and will typically be allocated a secondary order of pairing.

The base unit control circuit may upon determining the order of the pairing of the headset, update the headset firmware according to instructions for the determined order of pairing of the headset. The order of pairing of the headset may include a primary order of pairing, a new primary order of pairing, a secondary order of pairing, etc., and the base unit control circuit may be instructed not to update the headset firmware of a headset having a secondary order of pairing.

Typically, when a secondary headset is paired with a base unit, the purpose of the pairing is to immediately participate in for example an ongoing call, by listening in on the call, participate in the discussion, take over a call, etc., and therefore, the pairing of a secondary headset should be a fast process. It is advantageous to check the pairing order of a new or unpaired headset upon connection to the base unit so that a firmware update is not initiated if it is determined that the new headset has a secondary order of pairing.

Therefore, a further condition may be the checking of the order of pairing of the headset, and updating the headset firmware if the headset connected to the base unit is a primary or new primary headset and not updating the headset firmware if the headset connected to the base unit is a secondary headset.

However, if the base unit control circuit receives a secondary headset having a current secondary headset firmware version which is incompatible with the current base unit firmware version, the base unit control circuit may be configured to update the firmware of the secondary headset.

The base unit comprises a base unit storage and the base unit storage may store the headset firmware update having a headset firmware update version. The headset firmware update may be stored in the base unit storage until a new headset firmware update version is provided to the base unit, so that the storage for example is overwritten with the new headset firmware update having a new headset firmware update version. It is envisaged that the storage may furthermore be configured to store one or more headset firmware updates, such as one or more headset firmware updates being configured for specific headset types, such as one or more headset firmware updates corresponding to one or more headset firmware update versions, etc.

Thus, the base unit storage may store a number of headset firmware update versions. Thereby, also previous headset firmware updates may be stored in the base unit to be installed in a headset so as to bring a headset firmware up to the latest version, even if a plurality of headset firmware updates have been released between a last docking of the headset and a present docking of the headset. Furthermore, by storing headset firmware updates for specific headset types, different headsets as connectable to a same base may be provided with specific headset firmware updates.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout. Like elements will, thus, not be described in detail with respect to the description of each figure.

DETAILED DESCRIPTION OF THE FIGURES

Figure 1:
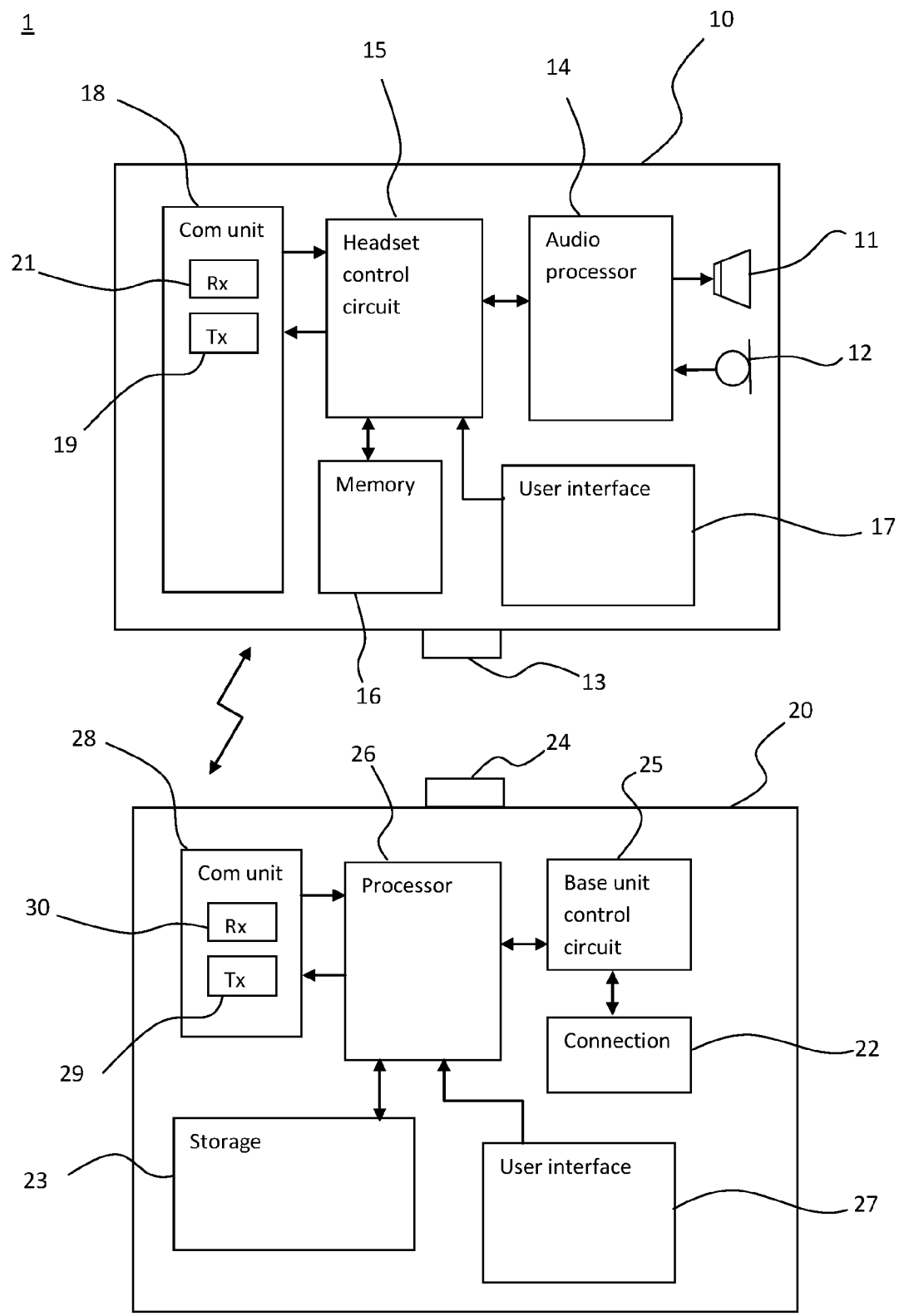
FIG. 1 shows schematically a headset system according to the present invention.

A headset system 1 comprising a base unit and a headset is shown schematically in FIG. 1. The headset 10 comprises a speaker 11, a microphone 12, and a physical interconnecting element 13 for interconnection with a base unit 20, a processor 14 configured to process audio signals and a headset control circuit 15 being configured to control the processor 14 and the interconnection with the base unit 20, the headset has a current headset firmware version stored in memory 16, such as an EEPROM or a flash memory. The headset may furthermore have a headset user interface 17, and the headset may be a wireless headset comprising a communications unit 18, such as a communications unit have a transmitter 19, and a receiver 21.

The base unit 20 is configured to connect to a computer system (not shown in FIG. 1) via computer system interface 22 and comprises a base unit storage 23, a dock 33 for the headset 24, the dock comprising an interconnecting element 24 for interconnection with interconnecting element 13 of the headset 10, 32 and a base unit control circuit 25 configured to control a base unit processor 26 and the dock 33 with the headset. The base unit may furthermore have a base unit user interface 27, and the headset system may be a wireless headset system, enabling wireless communication between the base unit and the headset. Thus, the base unit may comprise a communications unit 28, such as a communications unit 28 having a transmitter 29 and a receiver 30. The communications units 18, 28 in base unit 20 and headset 10, 32 may thus be wireless communications units 18, 28

The base unit control circuit 25 is being configured to receive a headset system firmware update from the computer system (not shown) via connection 22. The headset system firmware update typically comprises a base unit firmware update and a headset firmware update.

The base unit control circuit 25 is configured to store the headset firmware update in the base unit storage 23, and to update the current headset firmware of the headset 10 connected to the base unit 20 if the current headset firmware version is different from the headset firmware update version stored in the storage 23.

Figure 2:
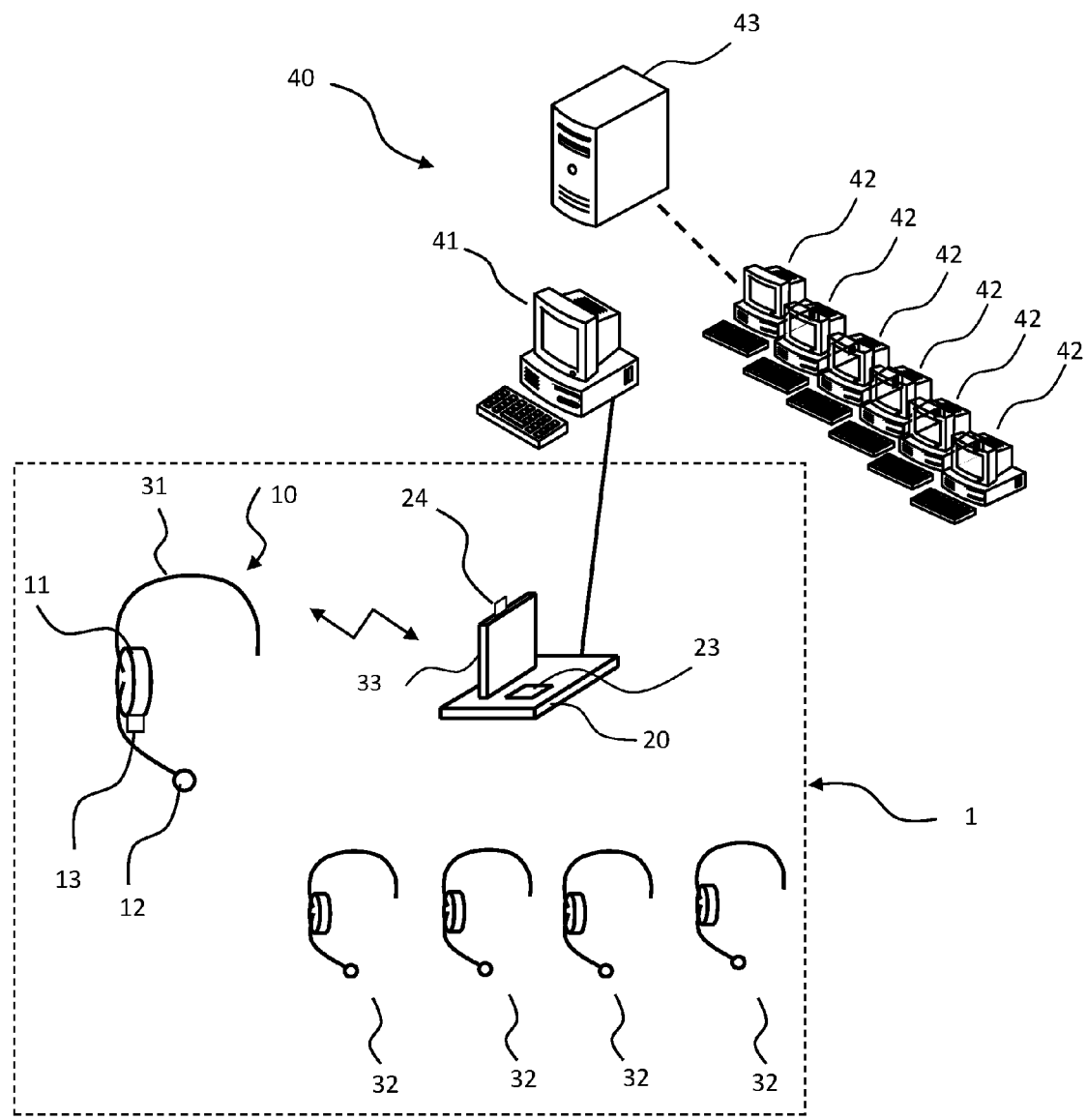
FIG. 2 shows schematically another headset system according to the present invention.

In FIG. 2, another headset system 1 according to the present invention is shown schematically. The headset system 1 comprising headsets 10, 32 and base unit 20 is shown. Each headset 10, 32 comprises an earphone or speaker 11 and a microphone 12. The headset may have any wearing style, and may be configured to be kept in place at the ear of a user using a headband 31. Also other wearing styles such as a neckband, an ear hook, etc. may be used. It is envisaged that also a headset having two earphones may be used in a method and system according to the present invention. The headset 10 also has an interconnecting element 13 configured to provide an interconnection to interconnecting element 24 provided in dock 33 of the base unit 20. A plurality of headsets 32 may be connectable to base unit 20, the headsets may subsequently be provided in dock 33 and may be connected to the base unit either subsequently or more headsets may maintain a wireless connection with the base unit simultaneously, e.g. to provide for conference functionalities. The base unit 20 has a storage 23 and a dock 33 configured to receive the headsets 10, 32. It is understandable, due to the critical nature of a firmware update, that a process of updating a headset firmware is only performed when the headset is docked in the base unit. Typically, firmware will not be updated over a wireless link, both due to the fact that this would require the headset communications unit to remain functional during the update and due to the possible instabilities of a wireless connection.

The base unit 20 is connected to computer system 40, comprising a network of computers 41, 42, and a server 43. The computer system 40 may be any computer system 40 connecting a plurality of computers 41, 42, for example to allow for mass deployment of updates, such as firmware and/or software updates. The computer system 40 may have a physical server 43, or the computer system may be a cloud based computer system 40, connecting to the server 43 via a remote connection, such as the internet. The computer system may implement a soft phone system, a call center phone management system, an internet provided phone system, etc.

Figure 3:
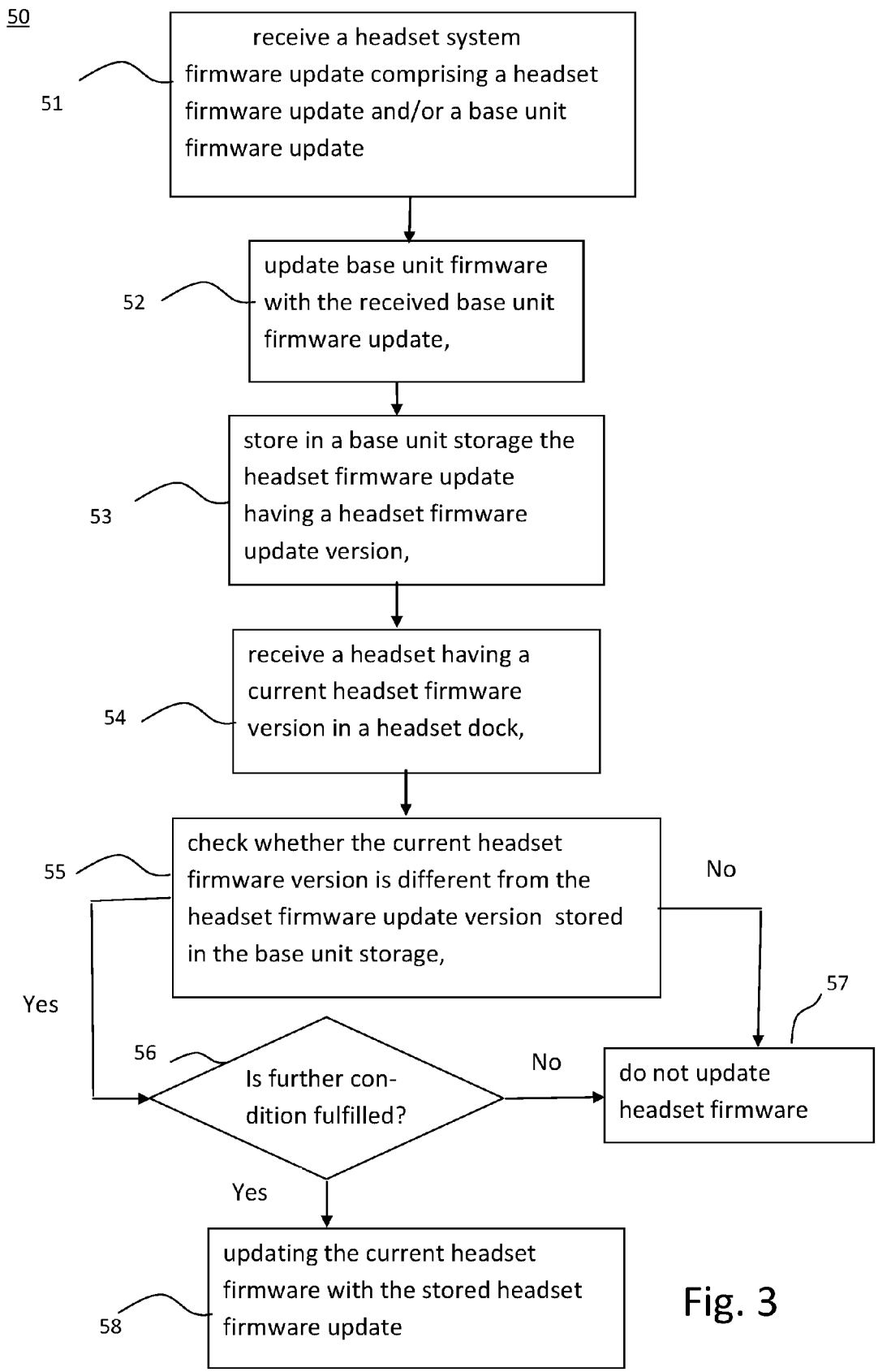
FIG. 3 shows a flow chart of a method according to the present invention.

In FIG. 3, a flow chart 50 is shown, illustrating a method according to the present invention.

In step 51, a headset system firmware update comprising a headset firmware update and/or a base unit firmware update is received in a base unit. The headset system firmware update may be provided in any conventional way as known to a person skilled in the art, such as a data package, etc. In step 52, the base unit firmware is updated with the received base unit firmware update. This update process may take a couple of minutes, such as 5 minutes, 10 minutes or more. Upon receiving the headset system firmware update, the headset firmware update is stored in a base unit storage in step 53. The headset firmware update has a headset firmware update version. In step 54, a headset 10, 32 having a current headset firmware version is received in a headset dock 33. It is envisaged that this headset 10, 32 having a current headset firmware version may be present in the dock 33 upon receiving the headset system firmware update from the computer system, or may be received in the dock at any later time. In step 55, it is checked whether the current headset firmware version is different from the headset firmware update version as stored in the base unit storage 23, and thus whether a first condition is fulfilled. If "no", and the current headset firmware version corresponds to the headset firmware update version, the headset firmware is not updated and the process is ended in step 57. If "yes" and the current headset firmware version is different from the headset firmware update version, the further conditions are checked in step 56. The further conditions may include checking of whether the headset firmware update version is newer and/or has a higher version, e.g. such as a higher version number than the current headset firmware version, and updating the headset only if the firmware update version is newer and/or has a higher version, such as a higher version number, than the current headset firmware version. The further conditions may include checking the order of pairing of the headset, and updating the headset firmware if the headset connected to the base unit is a primary or new primary headset and not updating the headset firmware if the headset connected to the base unit is a secondary headset. If the further conditions are fulfilled, then the headset firmware is updated in step 58, if the conditions are not fulfilled, then the headset firmware is not updated and the process is ended in step 57.

Although particular embodiments of the present inventions have been shown and described, it will be understood that it is not intended to limit the claimed inventions to the preferred embodiments, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

REFERENCES

1 headset system
10 headset
11 earphone
12 microphone
13 interconnecting element 14 audio processor
15 headset control circuit
16 memory
17 user interface
18 communications unit
19 transmitter
20 base unit
21 receiver
22 computer system interface
23 base unit storage
24 interconnecting element
25 base unit control circuit
26 base unit processor
27 user interface
28 communications unit
29 transmitter
30 receiver
31 headband
32 headset
33 dock
40 computer system
41, 42 computers
43 server

The invention claimed is:

1. A method of updating firmware in a headset system comprising at least two headsets, including primary and secondary headsets, and said headsets being linkable to a base unit by pairing, the base unit having a control circuit and being configured to connect to a computer system, the base unit including a headset dock to receive the headsets, the method comprising the steps of:
   receiving and storing in the control circuit a plurality of headset firmware updates from the computer system, the headset firmware updates including at least a latest update version and at least one prior update version,
   when a headset is docked in the headset dock, controlling the control circuit to check whether:
   a. whether the headset is paired to the base unit;
   b. whether the headset is paired as the primary or secondary headset to the base unit;
   c. whether a current headset firmware version is the same as a headset firmware update version stored in the base unit, determining as necessary to bring the headset up to the latest update version;
   d. if the headset is the primary paired headset to the base unit, then updating the current headset firmware update version as necessary to bring the headset up to the latest update version from the stored headset firmware updates;
   e. if the headset is not the primary paired headset to the base unit, but a current headset firmware version in the secondarily paired headset is compatible with the base unit, then bypass updating; and
   f. if the headset is not the primary paired headset to the base unit, but the current headset firmware version in the secondarily paired headset is not compatible with the base unit, then updating the current headset firmware version as necessary to bring the headset up to the latest update version from the stored headset firmware updates.

2. A method according to claim 1, wherein the headset system during updating of the current headset firmware version is provided in a firmware update mode in which the headset is docked in the base unit and is not operational.

3. A method according to claim 2, wherein the headset is provided in the firmware update mode if the control circuit determines that current headset firmware version is different from the latest update version.

4. A method according to claim 1, wherein an alert is provided to a user of the headset system during updating of the current headset firmware version.

5. A method according to claim 1, wherein the headset firmware updates are provided to the base unit using a mass deployment scheme.

6. A method according to claim 1, wherein the headset firmware updates are stored in a base unit storage until a new headset firmware update version is provided to the base unit.

7. A method according to claim 1, wherein a base unit storage is configured to store the headset firmware updates.

8. A method according to claim 7, wherein each of the headset firmware updates are being configured for a specific headset type.

9. A method according to claim 7, wherein the headset firmware updates corresponds to one or more headset firmware update versions.

10. A method according to claim 1, wherein the headsets are wireless headsets and wherein the wireless protocol is updated with the headset firmware updates.

11. A headset system comprising a base unit and at least primary and secondary headsets configured to connect and communicate with the base unit, said headsets each comprising an earphone, a microphone, and being configured to provide an interconnection to the base unit, a processor configured to process audio signals and a headset control circuit being configured to control the processor and the interconnection with the base unit, each headset having a stored headset firmware version, the base unit being configured to connect to a computer system and comprising a base unit storage, a dock for receiving the headsets and a base unit control circuit configured to control a base unit processor,
   the base unit control circuit being configured to receive a headset system firmware update from the computer system, the headset system firmware update comprising a base unit firmware update and a headset firmware update, wherein the base unit control circuit is configured to store the headset firmware update in the base unit storage, detect a firmware version in the docked headset:
   if the stored headset firmware version is different from a newer headset firmware update version stored in the base unit storage, then the control circuit is configured to provide all available updates to bring the headset to the newer update version according the following sequence:
   a. the control circuit detects if the headset is paired to the base unit;
   b. the control circuit detects whether the headset is paired as a primary or secondary headset to the base unit;
   c. the control circuit detects whether a current stored headset firmware version is the same as the newer headset firmware update version stored in the base unit storage, determining as necessary to bring the headset up to the newer headset firmware update version;
   d. if the headset is the primary paired headset to the base unit, then the control circuit updates the current stored headset firmware version as necessary to bring the headset up to the newer headset firmware update version from the base unit storage;
   e. if the headset is not the primary headset to the base unit, but a current stored headset firmware version in the secondary paired headset is compatible with the base unit, then bypass updating; and f. if the headset is not the primary headset to the base unit, but the current stored headset firmware version in the secondary paired headset is not compatible with the base unit, then the control circuit updates the current stored headset firmware version as necessary to bring the headset up to the newer headset firmware update version from the base unit storage.

12. A headset system according to claim 11, wherein the headsets are wireless headset(s) and wherein the headset and the base unit each comprises a wireless communications unit configured for wireless data communication between the headset and the base unit.

13. A method of updating a headset system firmware, the headset system comprising at least primary and secondary headsets paired with a base unit, the base unit having a base unit control circuit and being configured to connect to a computer system, the base unit comprising a headset dock to receive the headset, the method comprising the steps of:

physically docking the headsets into the base unit;

receiving, in the base unit control circuit a headset system firmware update from the computer system, the headset system firmware update comprising a headset firmware update, storing in a base unit storage at least a latest headset firmware update version having a headset firmware update version, as a headset is received in the headset dock, accessing the base unit control circuit to check whether a current headset firmware version is the same as the headset firmware update version stored in the base unit storage, determining as necessary to bring the headset up to the latest update version;

updating the current headset firmware version as necessary to bring the headset up to the latest update version from the base unit storage according to the following conditions:

a. determining whether the headset is docket in the base unit;

b. determining if the headset is paired to the base unit;

c. determining whether the headset is paired as a primary or secondary headset to that base unit;

d. determining whether the current headset firmware version is the same as the headset firmware update version stored in the base unit storage, determining as necessary to bring the headset up to the latest update version;

e. if the headset is the primary paired headset to the base unit, then updating the current headset firmware version as necessary to bring the headset up to the latest update version from the base unit storage;

f. if the headset is not the primary headset to the base unit, but the firmware in the secondarily paired headset is compatible with that base unit, then bypass updating.

* * * * *